US008104754B1

(12) United States Patent
Clark

(10) Patent No.: US 8,104,754 B1
(45) Date of Patent: Jan. 31, 2012

(54) ADJUSTABLE WORKPIECE POSITIONING AND CLAMPING SYSTEM

(75) Inventor: Scott L. Clark, Boone, IA (US)

(73) Assignee: Allen IP Inc., Huxley, IA (US)

( * ) Notice: Subject to any disclaimer, the term of this patent is extended or adjusted under 35 U.S.C. 154(b) by 307 days.

(21) Appl. No.: 12/475,059

(22) Filed: May 29, 2009

Related U.S. Application Data

(60) Provisional application No. 61/057,655, filed on May 30, 2008.

(51) Int. Cl.
*B23Q 3/00* (2006.01)
*B25B 27/14* (2006.01)

(52) U.S. Cl. ....... 269/289 R; 269/37; 269/291; 29/281.1

(58) Field of Classification Search .................. 269/157, 269/239, 246, 291, 243, 93, 56, 58, 59, 60, 269/76, 81, 100, 900, 88, 99, 289 R, 37, 149, 269/249, 9, 10, 319, 231, 315, 303, 301, 269/300, 304; 408/103, 107; 144/286.1, 144/287, 286.5; 29/559, 281.1; 83/904, 83/440, 441, 448, 452, 468.7, 268, 249, 247, 83/454, 829; 104/110, 107, 106, 89; 238/10 F
See application file for complete search history.

(56) References Cited

U.S. PATENT DOCUMENTS 1,026,475 A * 5/1912 Tarbuck ........................ 269/100
1,285,628 A * 11/1918 Craley ............................ 384/39
1,820,667 A 8/1931 Leyes
2,430,613 A * 11/1947 Hodge .......................... 269/138
2,705,441 A * 4/1955 Armstrong ....................... 269/91
3,070,138 A * 12/1962 Baasland ................... 144/286.1
3,172,654 A * 3/1965 Daniel et al. ..................... 269/93
3,570,837 A * 3/1971 Pohjola ........................... 269/94
3,984,092 A * 10/1976 Fitzpatrick ...................... 269/88
4,170,345 A * 10/1979 Townsend ....................... 269/88
4,186,916 A * 2/1980 Varga ............................ 269/303
4,196,897 A * 4/1980 Gordon ........................... 269/99
4,244,253 A * 1/1981 Flanigan ...................... 83/410.9
4,981,207 A * 1/1991 Kuikka ...................... 198/735.3

(Continued)

FOREIGN PATENT DOCUMENTS

DE 4201186 A1 * 7/1993

OTHER PUBLICATIONS

Kreg Bench Klamping System, www.kregtool.com, Kreg Tool Company, 2 pages, more than one year prior to May 29, 2009.

*Primary Examiner* — Joseph J Hail
*Assistant Examiner* — Tyrone Hall, Jr.
(74) *Attorney, Agent, or Firm* — Zarley Law Firm, P.L.C.

(57) ABSTRACT

An assembly comprises a platform including a first clamping surface, a track proximate to an edge of the first clamping surface, and a clamp mechanism including a second clamping surface. The clamp mechanism is configured to clamp a workpiece between the first clamping surface and the second clamping surface. The clamp mechanism is mounted to the track. The clamp mechanism is positionable at different locations along the track. The assembly may further comprise one or more adjustable spacer blocks mountable to the track to facilitate precisely positioning a workpiece proximate to the track at least two different spacings.

14 Claims, 4 Drawing Sheets

U.S. PATENT DOCUMENTS

| | | | | |
|---|---|---|---|---|
| 4,989,654 | A * | 2/1991 | Berkeley | 144/286.5 |
| 5,499,802 | A * | 3/1996 | Haberle | 269/99 |
| 5,584,254 | A * | 12/1996 | Williams | 108/118 |
| 5,608,970 | A | 3/1997 | Owen | |
| 5,865,780 | A * | 2/1999 | Tuite | 602/32 |
| 5,913,509 | A * | 6/1999 | Price et al. | 269/71 |
| 6,000,344 | A * | 12/1999 | Martin | 108/28 |
| 6,042,096 | A | 3/2000 | MacLean | |
| 6,394,712 | B1 | 5/2002 | Weinstein et al. | |
| 2003/0233925 | A1* | 12/2003 | Makropoulos | 83/829 |

* cited by examiner

ADJUSTABLE WORKPIECE POSITIONING AND CLAMPING SYSTEM

This application claims the benefit of U.S. Provisional Application No. 61/057,655, filed May 30, 2008, the entire content of which is incorporated by reference herein.

TECHNICAL FIELD

The invention relates to clamping of a workpiece such as a woodworking workpiece.

BACKGROUND

Clamps are often used to secure a workpiece to a workbench in order to more easily perform an operation on the workpiece. For example, various clamps may be used to secure a workpiece on the top surface of a workbench for performing operations such as cutting, sanding, drilling, routing and joining techniques including nailing, screwing, gluing and other techniques. Other operations may also be performed to a workpiece secured on the top of a workbench.

SUMMARY

In general, the invention relates to techniques for clamping a workpiece to a platform including a clamping surface. The disclosed techniques include a hand-operated clamp mechanism that is positionable along one or more tracks proximate to the clamping surface of the platform. The clamp mechanism also includes a clamping surface that combines with the clamping surface of the platform to constrain a workpiece to the platform. The described techniques also include adjustable spacer blocks mountable to the tracks. The adjustable spacer blocks facilitate precisely positioning a workpiece proximate to the tracks at least two different spacings.

In one embodiment, an assembly comprises a platform including a first clamping surface, a track proximate to an edge of the first clamping surface, and a clamp mechanism including a second clamping surface. The clamp mechanism is configured to clamp a workpiece between the first clamping surface and the second clamping surface. The clamp mechanism is mounted to the track. The clamp mechanism is positionable at different locations along the track.

In a different embodiment, the invention is directed to a track comprising a track having a top surface and a bottom surface opposite the top surface. The track forms a center T-slot extending along a longitudinal direction of the track and intersecting the top surface of the track, a first mounting T-slot extending along the longitudinal direction of the track and intersecting the bottom surface of the track, and a second mounting T-slot extending along the longitudinal direction of the track and intersecting the bottom surface of the track. The center T-slot is located between the first mounting T-slot and the second mounting T-slot.

In another embodiment, the invention is directed to a spacer block assembly comprising a body and a track-engaging component. The body forms a first alignment surface, and a second alignment surface, a first protrusion extending from a first track-engagement surface, and a second protrusion extending from a second track-engagement surface. The second alignment surface is opposite the first alignment surface. The track-engagement second surface is opposite the first track-engagement surface. The track-engaging component includes a shaft extending from the first protrusion, and a head configured to slideably engage a T-slot of a track. The body is configured such that the first protrusion slideably engages the T-slot in the track to maintain the alignment of the body when the head is slideably engaged in the T-slot.

The details of one or more embodiments of the invention are set forth in the accompanying drawings and the description below. Other features, objects, and advantages of the invention will be apparent from the description and drawings, and from the claims.

DETAILED DESCRIPTION

Figure 1A:
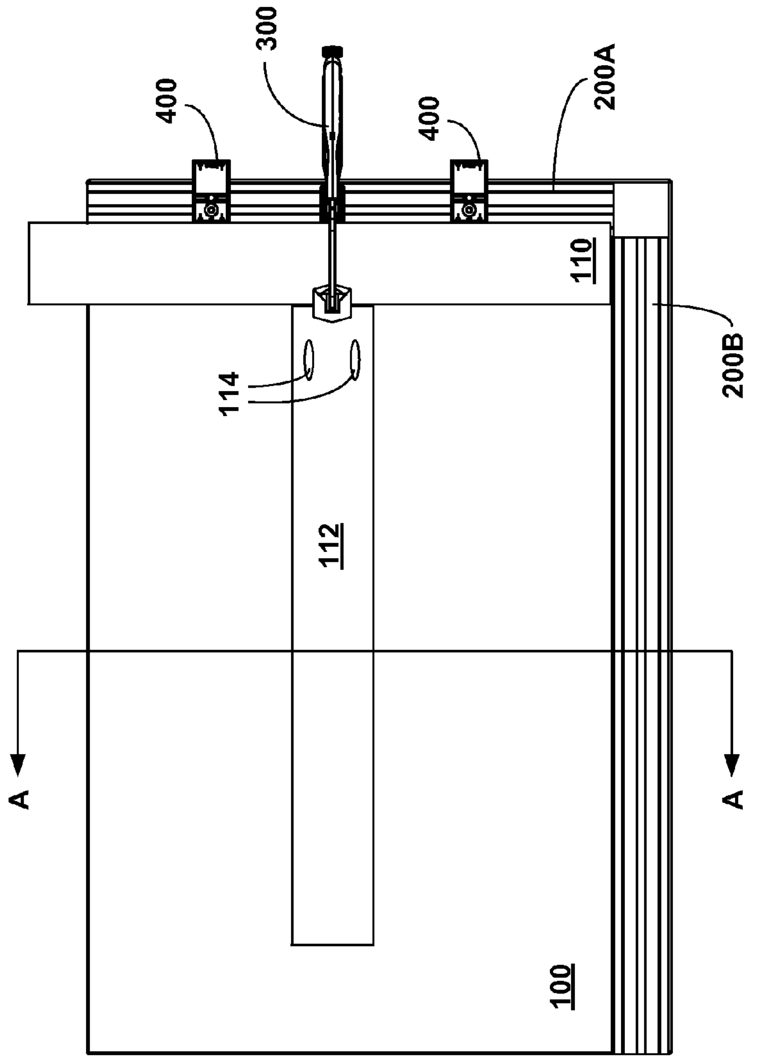
FIGS. 1A-1C illustrate an assembly including an adjustable track clamp holding two workpieces in place in a manner suitable for a pocket-screw joinery operation.
Figure 1B:
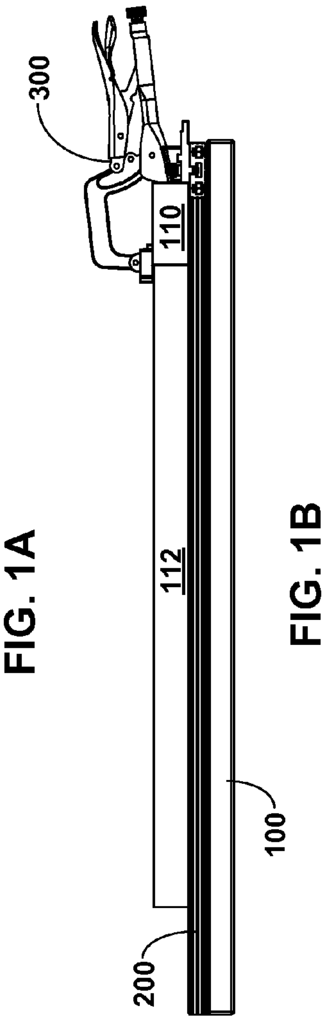
Figure 1C:
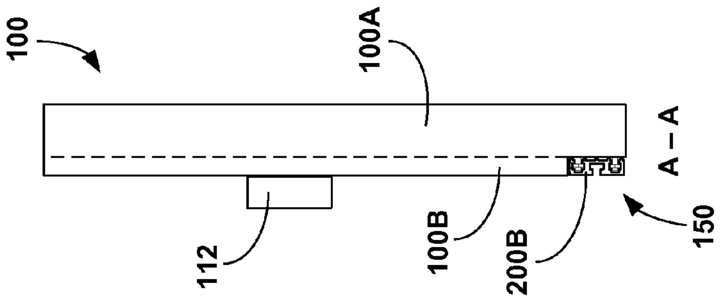
Figure 2A:
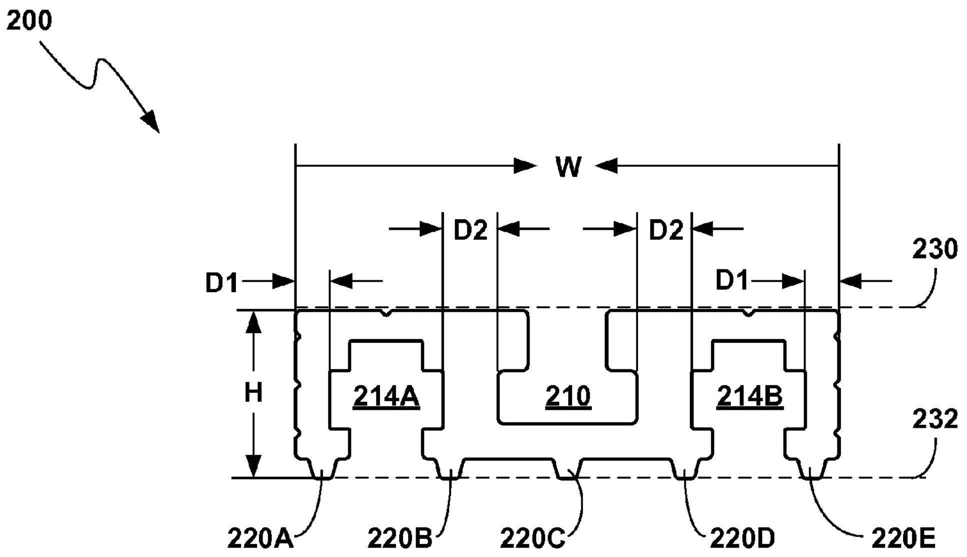
FIGS. 2A-2B illustrate a track that may be utilized as part of the assembly shown in FIGS. 1A-1C.
Figure 2B:
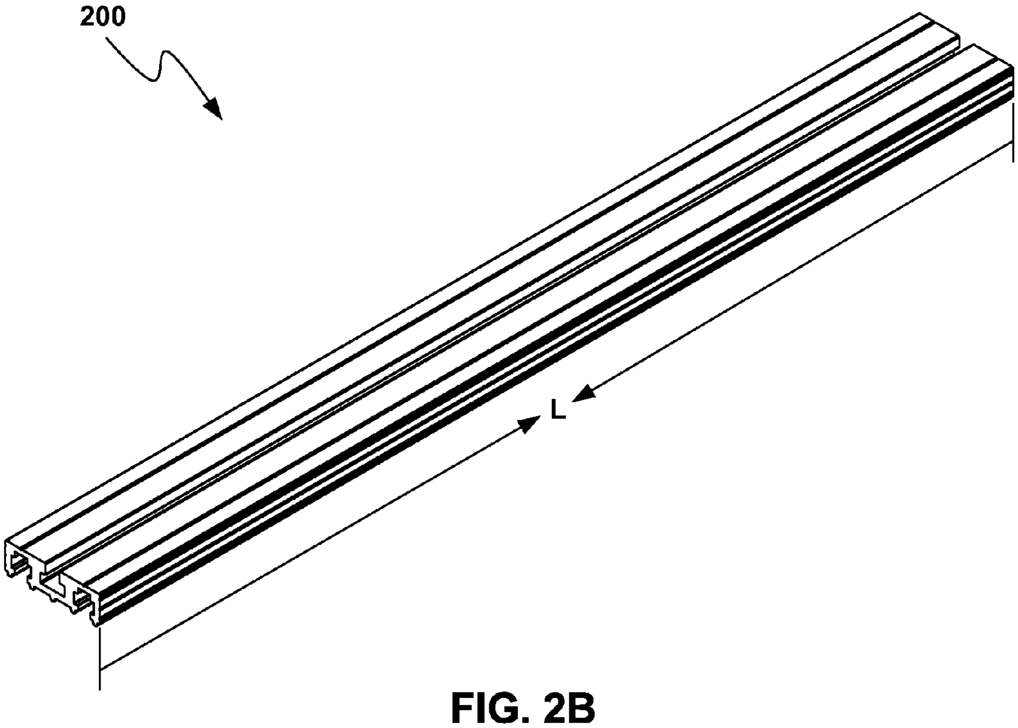
Figure 3A:
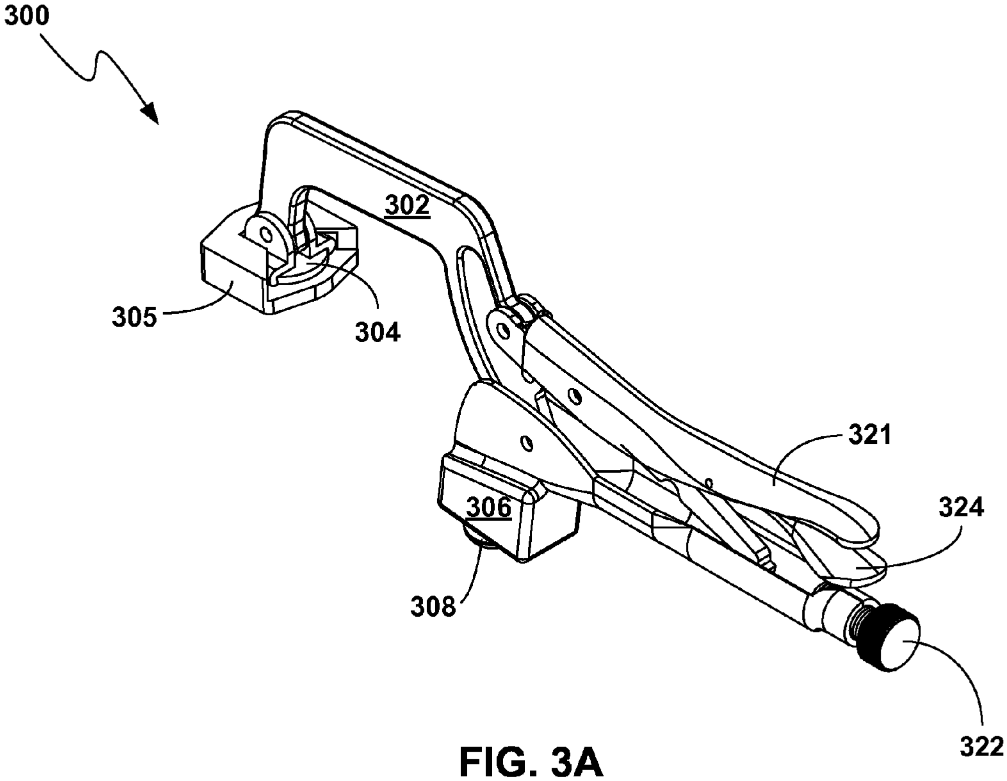
FIGS. 3A-3B illustrate a clamp mechanism that may be mounted to the track shown in FIGS. 2A-2B and utilized as part of the assembly shown in FIGS. 1A-1C.
Figure 3B:
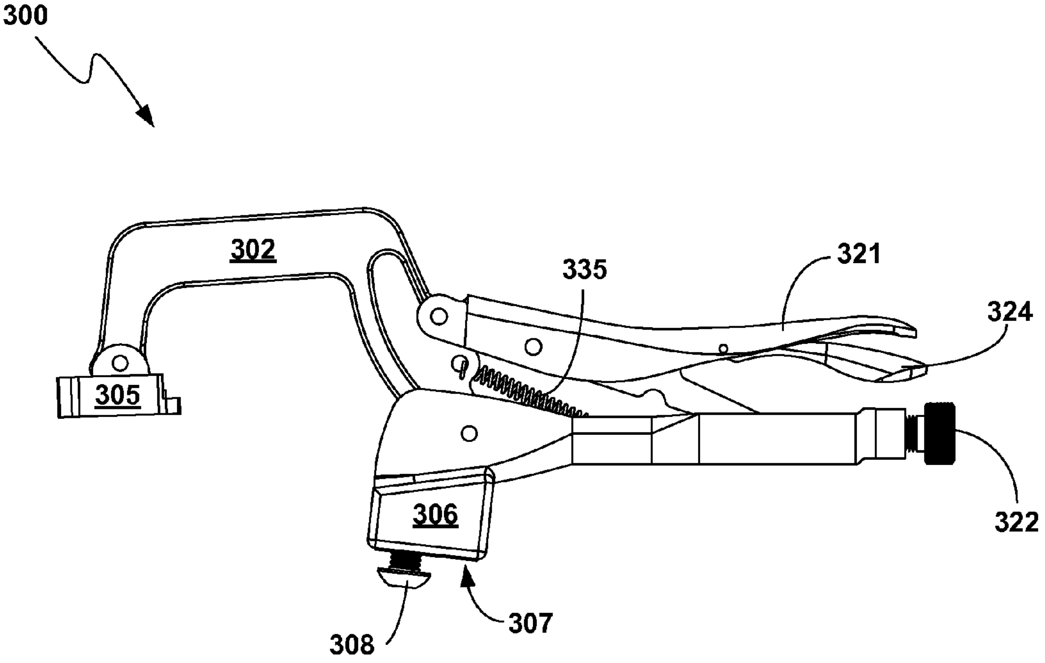

FIGS. 1A-1C illustrate an assembly including clamp mechanism 300 mounted on track 200 and holding two workpieces 110, 112 in place on platform 100 in a manner suitable for a pocket-screw joinery operation. FIGS. 2A-2B illustrate track 200, and FIGS. 3A-3B illustrate clamp mechanism 300. FIGS. 4A-4E illustrate spacer block assembly 400, which is used to precisely position workpiece 110 proximate to track 200A in the assembly shown in FIGS. 1A-1C.

The assembly of FIGS. 1A-1C includes tracks 200A, 200B positioned adjacent to edges of the clamping surface of platform 100. Platform 100 is rectangular; accordingly tracks 200A, 200B are positioned in a perpendicular orientation relative to one another. The assembly also includes clamp mechanism 300, which provides a second clamping surface to clamp workpieces 110, 112 to the clamping surface of platform 100. Spacer block assemblies 400 are used to align workpiece 110 with track 200A. Additional spacer block assemblies 400 may be used to align a workpiece with track 200B (not shown).

As shown in FIG. 1A, workpiece 112 includes pocket holes 114 to facilitate the pocket-screw joinery operation. Workpieces 110, 112 are positioned in a perpendicular orientation relative to one another on platform 100. Spacer block assemblies 400 hold workpiece 110 parallel to track 200A. Spacer block assemblies 400 are configured such that the clamping surface provided by removable clamp pad 305 (FIG. 3A) provided by clamping mechanism 300 extends beyond an outside edge of workpiece 110 such that removable clamp pad 305 engages both workpiece 112 as well as workpiece 110. The configuration of spacer block assemblies 400 accounts for the length of clamp arm 302 and the width of workpiece 110. As will be described in greater detail below, spacer block assemblies 400 are adjustable to account for four different workpiece thicknesses. Additional spacer block assemblies 400 (not shown) may be used to hold a different workpiece in alignment with track 200B. For example, such additional spacer block assemblies 400 may be useful to hold a workpiece in a perpendicular orientation relative to workpiece 110 for a pocket-screw joinery operation at the end of workpiece 110.

Platform 100 provides a clamping surface for securing workpieces 110, 112. Platform 100 also includes recess 150, which provides a mounting surface for tracks 200A and 200B. As shown in FIG. 1C, recess 150 has a depth that is greater than or equal to the height H (FIG. 2A) of tracks 200A, 200B such that a top surface 230 (FIG. 2A) of tracks 200A and 200B is no higher than the clamping surface of platform 100. This allows a workpiece to extend beyond the clamping surface of platform 100 without interference from track 200A or track 200B. For example, as shown in FIG. 1A, workpiece 110 extends over track 200A. In other embodiments, tracks may be mounted directed to the clamping surface of platform 100.

In some embodiments, platform 100 may include two separate components to provide recess 150: base component 100A and top component 100B (FIG. 1C). In such a configuration, top component 100B includes the clamping surface and is mounted to base component 100A. Tracks 200A and 200B would also be mounted directly to base component 100A. Top component 100B may have a height that is no greater than the height H of tracks 200A and 200B. Top component 100B is replaceable, which may be useful in even that the clamping surface of platform 100 becomes worn or otherwise damaged. For example, top component 100B may be secured to base component 100A using screws, bolts or other suitable techniques.

Clamp mechanism 300 is mounted to track 200A, and is positionable at any location on tracks 200A, 200B. Likewise, spacer blocks 400 are mounted to track 200A, and are also positionable at any location on tracks 200A, 200B.

Although pocket-screw joinery is commonly practiced on wood workpieces, any workpiece may be suitable for clamping to the clamping surface of platform 100 including wood, metal, plastic, composite and other workpieces. As previously mentioned, operations other than or in addition to pocket-screw joinery may be performed using the assembly of FIGS. 1A-1C. In addition, while workpieces 110, 112 are rectangular in shape, the assembly of FIGS. 1A-1C can be used to clamp workpieces having different shapes as well.

FIGS. 2A-2B illustrate track 200, which may be utilized for both track 200A and track 200B as part of the assembly shown in FIGS. 1A-1C. FIG. 2A illustrates the cross-section of track 200, whereas FIG. 2B provides a perspective view of track 200. The cross-section of track 200 perpendicular to the longitudinal length L of track 200 is substantially consistent throughout the longitudinal length of track 200. For the specific embodiment of track 200 shown in FIG. 2A, the features of track 200 are shown in proportional scale. However, the proportions shown in FIG. 2A are not necessary, and other embodiments will have different proportions.

In reference to FIG. 2A, track 200 forms center T-slot 210 extending along a longitudinal direction of track 200 and intersecting top surface 230 of track 200. Track 200 also forms mounting T-slots 214A, 214B extending along the longitudinal direction of track 200 and intersecting bottom surface 232 of track 200. Center T-slot 210 is located between the mounting T-slot 214A and mounting T-slot 214B.

As shown in FIGS. 1A-1C, clamp mechanism 300 and spacer block assemblies slideably mount in center T-slot 210 and are secured to top surface 230, which is substantially flat. Bolts are used in mounting T-slots 214A, 214B to secure tracks 200A, 200B to platform 100. For example, platform 100 may include a series of holes to accept the bolts used to mount track 200. The clamping operation of clamp mechanism 300 causes forces on center T-slot 210 at clamp mechanism 300 and counteracting forces on mounting T-slots 214A, 214B at bolts used to secure tracks 200A, 200B to platform 100. In this manner, the clamping operation of clamp mechanism 300 causes a twisting force on track 200.

Track 200 is preferably sufficiently stiff to support a clamping force without permanent deformation. The clamping force needs to be sufficient to secure a workpiece to platform 100 during an operation on the workpiece such as pocket-screw joinery. In this manner, track 200 includes features to improve stiffness while limiting the cross sectional area (and thus total material and weight) of track 200.

As one example, protrusions 220A-220E provide additional stiffness to limit bending along the length L of track 200. As another example, thicknesses D1, D2 are selected according to the forces experienced by those portions of track 200. For example, a minimum distance D1 of track 200 between one of the mounting slots and an edge of track 200 as measured in the width W direction of track 200 is about half of a minimum distance D2 of track 200 between one of mounting T-slots 314 and center T-slot 210 of track 200 as measured in the width W direction of track 200.

Track 200 may be made from any material providing a suitable wear resistance and thickness. Generally, track 200 will be made from a metal such as steel or aluminum. Other materials may also be used including wood, polymers, composites and others. Because of the constant cross-section of track 200, track 200 may be manufactured using an extrusion process. As one specific example, track 200 may comprise extruded aluminum. Track 200 may also comprise anodized aluminum.

FIGS. 3A-3B illustrate clamp mechanism 300. Clamp mechanism 300 includes clamp arm 302, pivotable clamp face 304 mounted on the distal end of clamp arm 302, removable clamp pad 305, hand-operated handle 321, release lever 324 and clamp-height adjustment screw 322. Removable clamp pad 305 comprises a softer material than pivotable clamp face 304. A user may optionally use clamp pad 305 to prevent marking a workpiece during clamping. Clamp mechanism 300 also includes spring 335, which serves to bias clamp mechanism 300 in either a closed or fully-open position dependent on the position of handle 321 and clamp arm 302.

Clamp mechanism 300 mounts to a T-slot of a track, such as center T-slot 210 of track 200 using screw 308. Screw 308 serves as a protrusion to slideably engage center T-slot 210 of track 200 to facilitate positioning clamp mechanism 300 at different locations along track 200. Screw 308 is threaded into block 306 at a depth that allows the slideable engagement. Block 306 provides a flat surface to interface with top surface 230 of track 200. Optionally, block 306 may also include glide pad 307 to reduce sliding friction between block 306 and top surface 230. For example, glide pad 307 may comprise a polymer and be attached to block 306 with an adhesive.

Different embodiments of clamp mechanism 300 may provide different clamping locations relative to the position of clamping block 306. For example, embodiments of clamp mechanism 300 may provide a length of clamp arm 302 selected according to a desired clamping location. As shown in FIG. 1A, the configuration of clamp art 302 and spacer block assemblies 400 may be used to precisely locate the clamping surface of clamp pad 305 relative to track 200.

FIGS. 4A-4E illustrate spacer block assembly 400. Spacer block assembly 400 may be mounted to track 200 and utilized as part of the assembly shown in FIGS. 1A-1C to precisely position one or more workpieces proximate to track 200. One or more of spacer block assemblies 400 may be used as a set to facilitate precisely locating a workpiece proximate track 200 according to any four different precise spacings. For example, as shown in FIG. 1A, a set of two spacer block assemblies 400 are used to precisely locate workpiece 110 proximate to track 200A.

Spacer block assembly 400 includes body 410, which forms alignment surfaces 420A, 420B, protrusions 412A, 412B and through-holes 413A, 413B, which each pass through one of protrusions 412A, 412B. Through-holes 413A, 413B are substantially parallel. Spacer block assembly 400 also includes track-engaging component 432, which includes threaded shaft 434 and head 433. Nut 436 is used for installing track-engaging component 432 within one of through-holes 413A, 413B with head 433 adjacent to the corresponding one of protrusions 412A, 412B. For example, as shown in FIGS. 4A-4E, track-engaging component 432 is constrained within through-hole 413B.

Spacer block assembly 400 mounts to a T-slot of a track, such as center T-slot 210 of track 200 using track-engaging component 432. Track-engaging component 432 serves as a protrusion to slideably engage center T-slot 210 of track 200 to facilitate positioning spacer block assembly 400 at different locations along track 200. Nut 436 is threaded into shaft 434 and includes features to allow for finger-tightening. Nut can be tightened to hold spacer block assembly 400 at a desired track location or loosened to facilitate the slideable engagement.

In the configuration shown in FIGS. 4A-4E, head 433 is adjacent protrusion 412B, such that protrusion 412B slideably engages center T-slot 210 of track 200 to maintain the alignment of body 410 when track-engaging component 432 is slideably engaged in center T-slot 210. The configuration shown in FIGS. 4A-4E provides two different precise spacings because body 410 can be oriented such that either alignment surface 420A or alignment surface 420B can be used to precisely position a workpiece relative to track 200. Spacer block assembly 400 also provides two more precise spacing as it can be reconfigured by installing track-engaging component 432 within through-hole 413A instead of through-hole 413B. In such a configuration, head 433 would be positioned adjacent protrusion 412A.

As discussed with respect to FIGS. 1A-1C, the multiple spacings provided by spacer block assembly 400 may be suitable to position workpieces of different widths such that the clamping surface provided by clamping mechanism 300 extends beyond an outside edge of the workpiece. This allows the clamping surface provided by clamping mechanism 300 to engage both a workpiece positioned against spacer block assembly 400 as well as a workpiece abutting the workpiece positioned against spacer block assembly 400. For example, as discussed with respect to FIGS. 1A-1C, the clamp surface of clamping mechanism 300 engages both of workpieces 110, 112 simultaneously, e.g., to facilitate pocket-screw joinery.

Figure 4A:
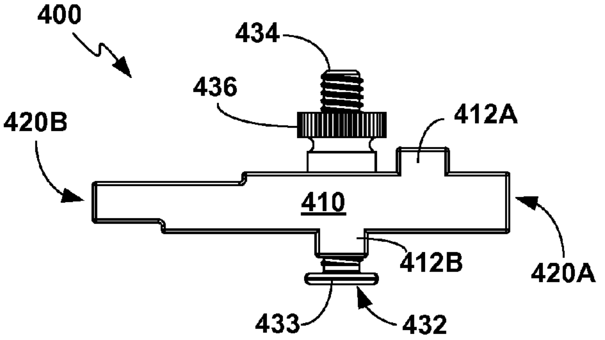
FIGS. 4A-4E illustrate an adjustable spacer block assembly that may be mounted to the track shown in FIGS. 2A-2B and utilized as part of the assembly shown in FIGS. 1A-1C to precisely position one or more workpieces proximate to the track.
Figure 4B:
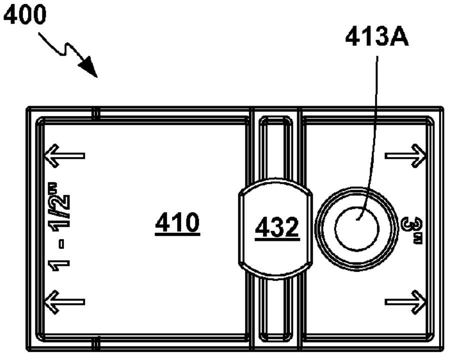
Figure 4D:
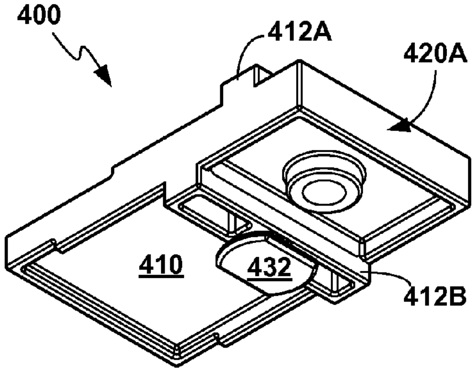
Figure 4C:
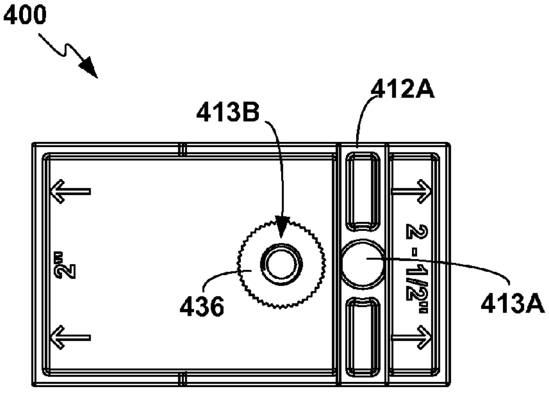
Figure 4E:
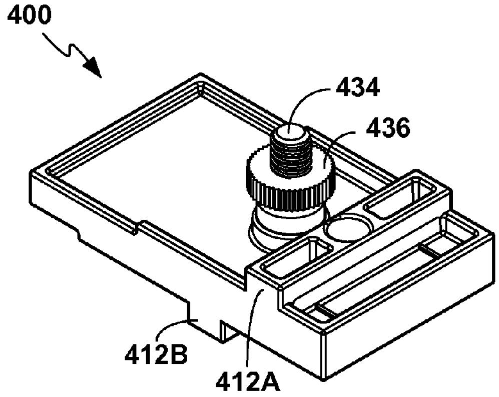

As indicated by the markings in FIG. 4B, a configuration in which track-engaging component 432 is installed in through-hole 413A provides such spacing for workpieces having a nominal thickness of either 1.5 inches or 3 inches. Similarly, as indicated by the markings in FIG. 4C, a configuration in which track-engaging component 432 is installed in through-hole 413B provides such spacing for workpieces having a nominal thickness of either 2 inches or 2.5 inches. The markings shown in FIGS. 4B and 4C are useful to allow a user to quickly set up a proper configuration for a given workpiece thickness. Other embodiments may facilitate precise spacing at different intervals. However, it should be noted that the sum of the two spacing provided by each configuration (e.g., either utilizing through-hole 413A or through-hole 413B) must be the same since the width of body 410 does not change. In the example of FIGS. 4A-4E, 1.5 inches plus 3 inches equals 4.5 inches, and 2 inches plus 2.5 inches also equals 4.5 inches.

Body 410 may be formed from any suitable material. Such materials include metal, wood, polymers, composites and other materials. As one specific example, body 410 may comprise an injected-molded polymer.

Various embodiments of the invention have been described. These and other embodiments are within the scope of the following claims.

The invention claimed is:

1. A track comprising having a top surface and a bottom surface opposite the top surface, wherein the track forms:

a center T-slot extending along a longitudinal direction of the track and intersecting the top surface of the track;

a first mounting T-slot extending along the longitudinal direction of the track and intersecting the bottom surface of the track;

a second mounting T-slot extending along the longitudinal direction of the track and intersecting the bottom surface of the track, wherein the center T-slot is located between the first mounting T-slot and the second mounting T-slot; and wherein a minimum distance of the track between one of the mounting slots and an edge of the track as measured in the width direction of the track is about half of a minimum distance of the track between one of the mounting slots and the center T-slot of the track as measured in the width direction of the track.

2. The track of claim 1, wherein the cross-section of the track perpendicular to the longitudinal length of the track is consistent throughout the longitudinal length of the track.

3. The track of claim 1, wherein the top surface is flat.

4. The track of claim 1, wherein the bottom surface includes a set of protrusions that combine to form the bottom surface.

5. The track of claim 1, wherein the track comprises extruded aluminum.

6. A spacer block assembly comprising:

a body forming:

a first alignment surface, a second alignment surface, wherein the second alignment surface is opposite the first alignment surface, a first protrusion extending from a first track-engagement surface, a second protrusion extending from a second track-engagement surface, wherein the second track-engagement surface is opposite the first track-engagement surface, a track-engaging component including:

a shaft extending from the first protrusion, and a head configured to slideably engage a T-slot of a track, wherein the body is configured such that the first protrusion slideably engages the T-slot in the track to maintain the alignment of the body when the head is slideably engaged in the T-slot;

wherein the body further forms:

a first hole in the first protrusion; and a second hole in the second protrusion;

wherein the shaft of the track-engaging component is a threaded shaft sized to fit within both the first hole and the second hole, further comprising a nut engaging the threaded shaft opposite the first protrusion.

7. The spacer block assembly of claim 6, wherein the spacer block assembly is reversible such that either one of the first alignment surface and the second alignment surface may be utilized to facilitate precisely locating a workpiece proximate the track at one of at least two different spacings between a workpiece and the track, and wherein the first protrusion slideably engages the T-slot in the track to maintain the alignment of the body when the head is engaged in the T-slot when either one of the first alignment surface and the second alignment surface are utilized.

8. The spacer block assembly of claim 6, wherein the spacer block assembly can be reconfigured such that the track engaging component can extend from the second protrusion instead of the first protrusion such that the second protrusion would slideably engage the T-slot in the track to maintain the alignment of the body when the head of the track engaging component was engaged in the T-slot.

9. The spacer block assembly of claim 6, wherein the spacer block assembly is configured to facilitate precisely locating a workpiece proximate the track according to any of least four different precise spacings between a workpiece and the track.

10. The spacer block assembly of claim 6, wherein the first hole is parallel to the second hole.

11. The spacer block assembly of claim 6, wherein the body is an injection-molded polymer.

12. A spacer block assembly for positioning one or more workpieces proximate to a track comprising:

a body;

a first alignment surface formed on the body opposite a second alignment surface formed on the body;

a first track engagement surface formed on the body opposite a second track engagement surface formed on the body;

a track engaging component extending from one of the first and second track engagement surfaces to position the alignment surfaces at different spacings relative to the track;

wherein the first alignment surface positions a workpiece at a first spacing interval proximate to the track and the second alignment surface positions a workpiece at a second spacing interval proximate to the track when the track engaging component extends from the first track engagement surface and engages the track; and wherein the first alignment surface positions a workpiece at a third spacing interval proximate to the track and the second alignment surface positions a workpiece at a fourth spacing interval proximate to the track when the track engaging component extends from the second track engagement surface and engages the track.

13. The spacer block assembly of claim 12 additionally comprising a first protrusion extending from the first track engagement surface and a second protrusion extending from the second track engagement surface.

14. The spacer block assembly of claim 13 additionally comprising a first hole in the first protrusion and a second hole in the second protrusion wherein the first hole is parallel to the second hole wherein the track engaging component is installed within one of the first hole adjacent the first protrusion and the second hole adjacent the second protrusion.

* * * * *